United States Patent [19]

Dexter

[11] Patent Number: 5,029,795
[45] Date of Patent: Jul. 9, 1991

[54] CAMERA SUPPORT STAND

[76] Inventor: Ronald P. Dexter, 8675 Edwin Dr., Los Angeles, Calif. 90046

[21] Appl. No.: 392,827

[22] Filed: Aug. 11, 1989

[51] Int. Cl.⁵ .......................................... F16M 11/00
[52] U.S. Cl. .................... 248/431; 248/181; 248/432; 352/243
[58] Field of Search ............... 248/431, 432, 181, 182, 248/187, 183, 184, 185, 186; 352/243

[56] References Cited

U.S. PATENT DOCUMENTS

| | | |
|---|---|---|
| 362,384 | 5/1987 | Johnson . |
| 509,005 | 11/1893 | Voeltzkow ........................ 248/431 |
| 664,976 | 1/1901 | Sheffy et al. ...................... 248/431 |
| 1,371,263 | 3/1921 | Reed . |
| 1,561,371 | 11/1925 | Strupe . |
| 1,750,803 | 3/1930 | Hayden ............................ 248/187 |
| 1,915,466 | 6/1933 | Lilly . |
| 2,172,123 | 9/1939 | Ebert ................................ 248/164 |
| 2,368,740 | 2/1945 | Blomgren ..................... 248/432 X |
| 2,496,986 | 2/1950 | Coutant et al. .................... 248/181 |
| 2,710,733 | 6/1955 | Phillips ............................. 248/164 |
| 2,749,147 | 6/1956 | Herrschaft ........................ 248/431 |
| 2,796,226 | 6/1957 | Dalton et al. ..................... 248/183 |
| 3,275,278 | 9/1966 | Haydock .......................... 248/431 |
| 3,309,055 | 3/1967 | Sefcik .............................. 248/431 |
| 4,016,583 | 4/1977 | Yeates ............................... 354/293 |
| 4,027,988 | 6/1977 | Kum ................................. 403/218 |
| 4,549,710 | 10/1985 | Prince et al. ...................... 248/183 |
| 4,579,436 | 4/1986 | Jaumann .......................... 354/293 |
| 4,653,709 | 3/1987 | Paldino ............................ 248/183 |
| 4,699,484 | 10/1987 | Howell et al. .................... 352/243 |
| 4,738,422 | 4/1988 | Matheson et al. ................ 248/183 |

FOREIGN PATENT DOCUMENTS 923803 7/1947 France .
593520 5/1959 Italy .................................. 248/431

Primary Examiner—David L. Talbott
Attorney, Agent, or Firm—Spensley Horn Jubas & Lubitz

[57] ABSTRACT

A camera stand comprising an inverted tripod cradle and a bowl-shaped camera mount adapted to be carried in the cradle.

13 Claims, 3 Drawing Sheets

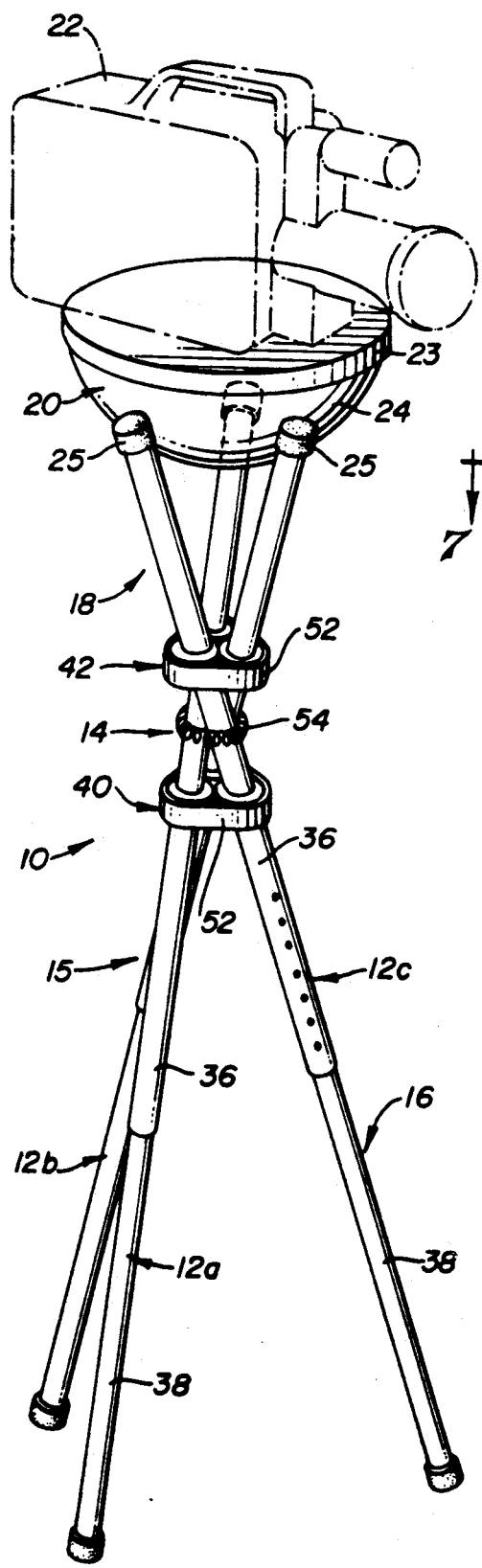
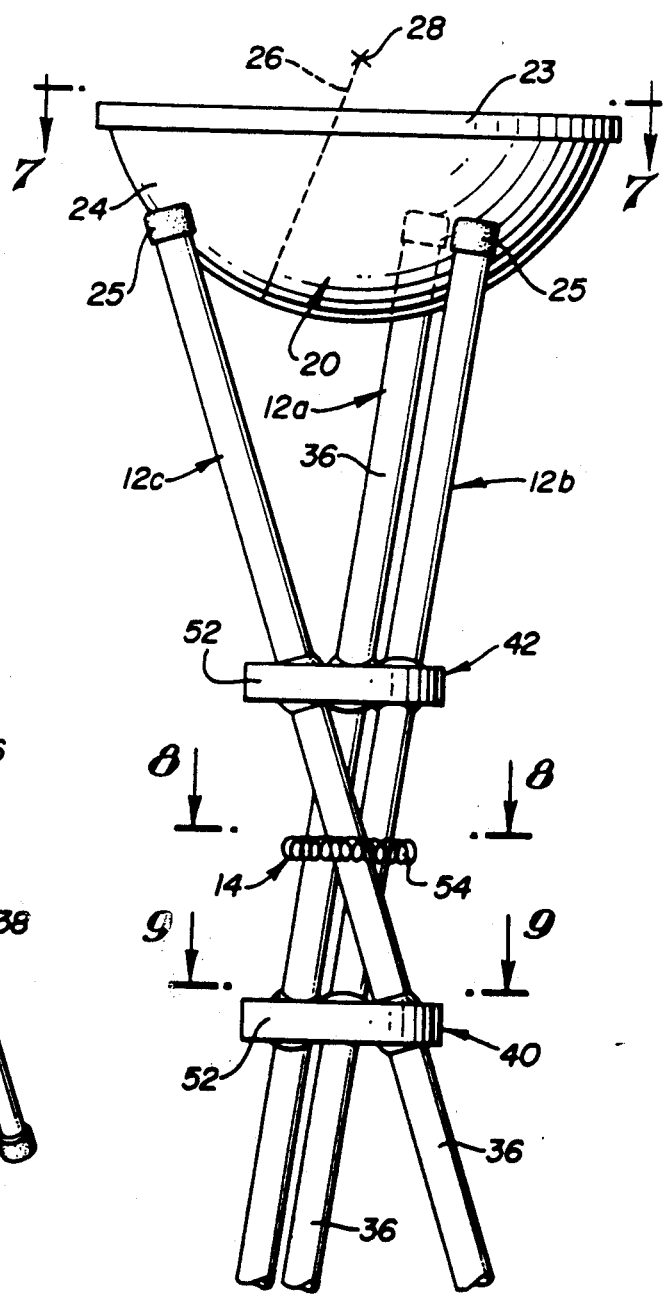

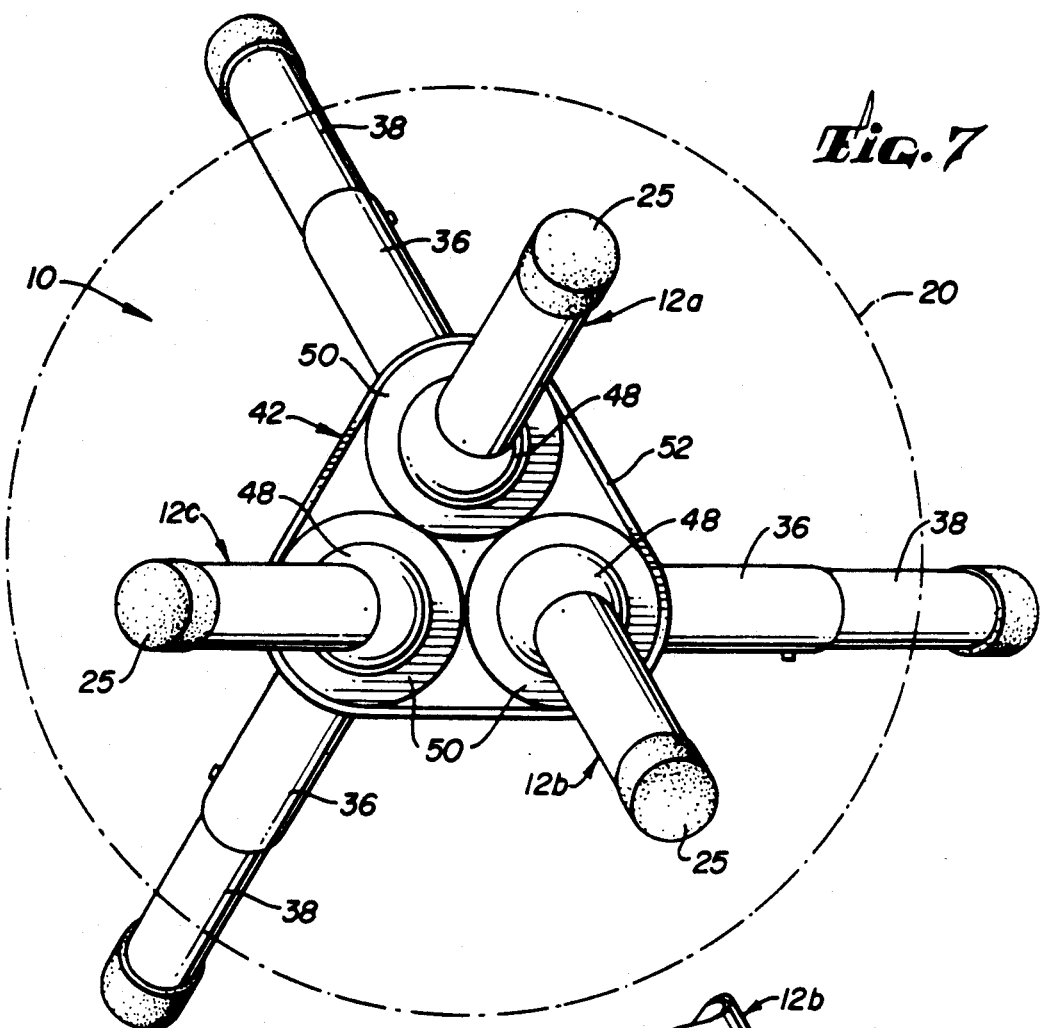
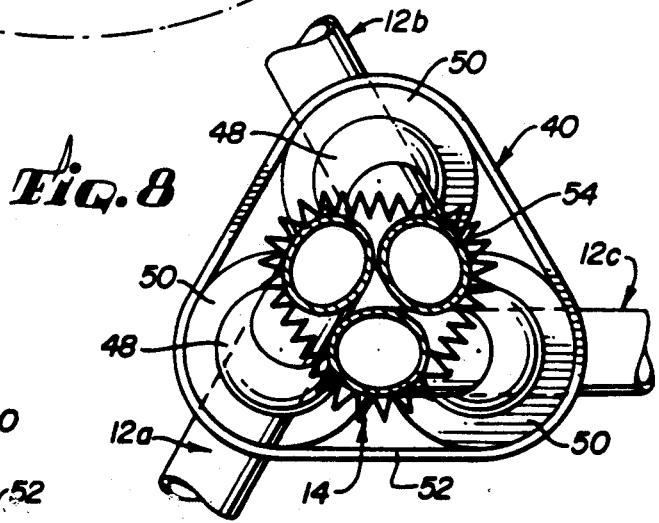
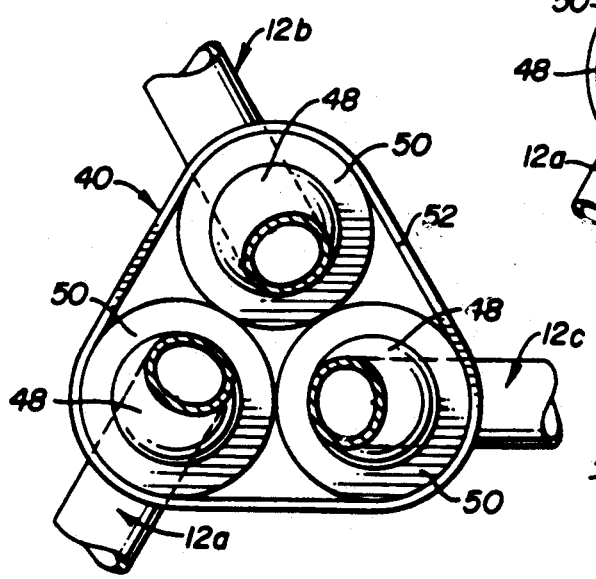

CAMERA SUPPORT STAND

BACKGROUND OF THE INVENTION

1. Field of the Invention.

The present invention relates to camera stands for supporting video and film cameras in operation.

2. Description of Related Art.

A variety of camera stands have been developed to secure the camera against unwanted movement while the camera is being operated. Camera stands typically have three legs which form a tripod to provide a stable base on a variety of different surfaces. The camera is mounted on the camera stand by a mechanism often referred to as the "head" which usually allows the camera to be panned or tilted. Because the camera stand is not always operated on a level surface, a leveling mechanism is often provided to level the camera head in relation to the tripod base. Once the camera head has been leveled, the head can be adjusted as needed to point the camera in the desired position to record an image.

An example of such a head and leveling mechanism is described in U.S. Pat. No. 4,579,436 to Jaumann. The Jaumann device includes a "ball and socket" type joint mounted above the tripod base, which allows limited movement of the head relative to the base. Once the head is leveled in the desired position, the head is locked in place.

One disadvantage of these prior camera stands is that the procedure for attaching the camera to the head and locking the head in the desired position is often a complex and time consuming procedure. These delays can be critical in news gathering and nature filming applications where important "shots" can be lost forever while the camera operator is setting up the camera on the camera stand or trying to adjust the head.

Besides being time consuming to operate, the mechanisms of many prior camera stand heads are often complex and expensive to manufacture. Moreover, dirt and other contaminants can jam and otherwise impede the proper operation of the head mechanisms.

Still further, these prior camera stand heads tend to be relatively tall and elongated. Consequently, the center of gravity of the camera is often substantially above the center of rotation of the head tilt mechanism, resulting in a degree of instability. This instability is particularly a problem for heavy cameras and telephoto lenses.

Various devices have been proposed to overcome some of these drawbacks. For example, U.S. Pat. No. 4,496,986 to Coutant, et al. describes a tripod with a "ball and socket" type joint which has three small plastic studs secured on the head of the tripod replacing the typical hemispherical socket. Such an arrangement is said to be less susceptible to contamination from dust and other particles. However, it is believed that the Coutant head has a relatively high center of gravity relative to the tilt center of rotation and has a complicated mechanism for locking the head in the desired position.

In U.S. Pat. No. 4,016,583 to Yeates, a ball and socket type camera stand head mechanism is described in which the ball is not locked by a locking mechanism to the underlying socket. Instead, it is proposed that the camera operator hold the camera supporting ball in place with one hand while operating the camera with the other hand. This device also appears to have a relatively high center of gravity. Moreover, it does not appear to be particularly well adapted for use with relatively large and heavy cameras.

U.S. Pat. No. 2,796,226 to Dalton et al. shows a "cradle" type head in which it appears that the center of gravity of the camera and head is close to the center of rotation of the head. However, this head mechanism appears to be relatively heavy and complex.

SUMMARY OF THE INVENTION

It is an object of the present invention to provide an improved camera stand obviating, for practical purposes, the above-mentioned limitations, particularly in a manner requiring a relatively uncomplicated mechanical arrangement.

This is achieved in a camera stand having, in accordance with one embodiment of the present invention, a bowl-shaped camera head for mounting the camera, and a plurality of elongated elements coupled together so as to space the upper ends of the elements sufficiently to receive and support the camera head bowl. In the illustrated embodiment, the elongated elements comprise poles which are pivotally coupled together so that the poles may be deployed to form a tripod base at the lower ends of the poles and an inverted tripod cradle at the upper ends of the poles. As will be discussed in greater detail below, the camera mounted on the camera head bowl may be inserted into the tripod cradle in any one of a large number of orientations and will be securely held in that orientation by gravity and the frictional engagement between the tripod cradle and the outer surface of the camera head bowl. Moreover, the camera is easily reoriented in another direction merely by repositioning the camera as desired. No releasing and relocking of any mechanisms is required. Still further, the center of gravity of the camera is positioned close to the center of support of the camera head bowl. As a consequence, the camera is very stable and therefore displacement of the camera orientation resulting from inadvertent bumping of the stand is minimized.

These and other objects and advantages will be made more clear in connection with the following description of the drawings.

BRIEF DESCRIPTION OF THE DRAWINGS

FIG. 1 is a perspective view illustrating a camera stand in accordance with a preferred embodiment of the present invention;

FIG. 2 is a front view of the camera stand of FIG. 1, illustrating the deployed position;

FIG. 7 is a top view of the tripod of FIG. 2, viewed along the lines 7—7 with the camera head bowl removed;

FIG. 8 is a cross-sectional view of the tripod of FIG. 2, viewed along the lines 8—8;

FIG. 9 is a cross-sectional view of the tripod of FIG. 2, viewed along the lines 9—9.

DETAILED DESCRIPTION OF THE DRAWINGS

Figure 3:
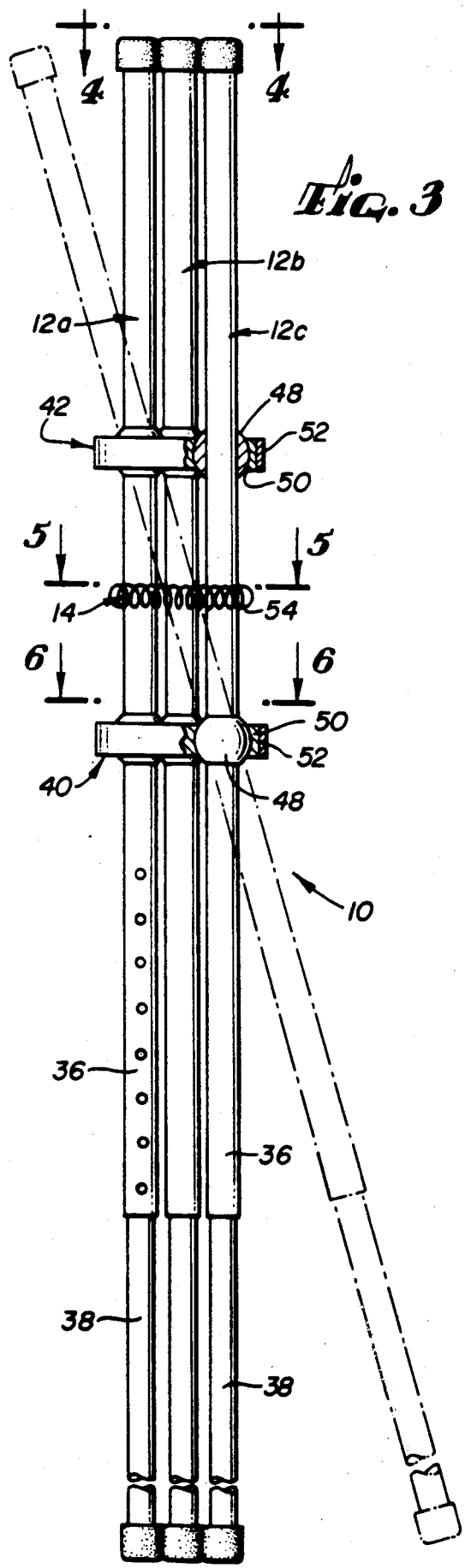
FIG. 3 is a front view of the tripod of the camera stand of FIG. 1, illustrating the collapsed position of the tripod.

A camera stand in accordance with a preferred embodiment of the present invention is indicated generally at 10. The camera stand 10 includes three elongate elements 12A-12C which are coupled together so as to pivot near a common point 14. In the illustrated embodiment, the elongate elements 12A-12C are formed from tubular poles which may be pivoted to a "deployed position" as illustrated in FIGS. 1, 2 and 7-9. In the deployed position, the poles 12A-12C form a tripod 15 which includes a tripod base 16 and an inverted tripod 18 above the coupling point 14. The inverted tripod 18 forms a three-point cradle which receives a bowl-shaped camera mount 20. A camera such as that indicated at 22 is securely attached to the bowl-shaped camera mount 20 by means of threaded fasteners, tongue and groove fasteners and the like (not shown) carried on a mounting plate 23. As will be explained in greater detail below, the bowl-shaped camera mount 20 together with the inverted tripod 18 form the head of the camera stand 10.

In the preferred embodiment, the bowl-shaped camera mount 20 (hereinafter "head bowl 20") is not fastened to the inverted tripod (hereinafter "head cradle") 18. Instead, because of the relatively large diameter of head bowl 20 and the corresponding spacing of the contact points of the head cradle 18, it has been found that the friction between the head bowl 20 and the head cradle 18 is sufficient to securely maintain the camera 22 in the desired orientation, even for relatively heavy cameras. Indeed, it is believed that an increase in the weight of the camera mounted on the head bowl 20 correspondingly increases the friction between the head bowl 20 and the head cradle 18.

Because there are no fasteners between the head bowl 20 and head cradle 18, the cameraman may place the head bowl mounted camera directly into the head cradle 18 in the desired orientation, and the camera 22 is instantaneously fixed in the desired position. Moreover, to pan or tilt the camera 22 to another position, the cameraman need merely reorient the camera to the desired position. There is no need for unlocking any mechanism before reorienting the camera and then relocking the mechanism once the desired position has been achieved. To increase the friction between the head bowl 20 and the tripod cradle 18, rubber or plastic end caps 25 may be placed over the upper ends of the poles 12A-12C to cover the contact points.

If it is anticipated that the camera will be used primarily with the stand 10, the camera may be left mounted on the head bowl 20 so that the camera is ready to be placed on the tripod 15 at all times. The head bowl 20 may be made hollow and therefore light enough so as not to unreasonably interfere with the use of the camera away from the tripod 15.

In the illustrated embodiment, the head bowl 20 includes a spherical surface 24 which is defined by a radius of curvature 26 centered at a point 28 (FIG. 2). Because of the relatively long length of the radius of curvature 26, it should be appreciated that relatively small adjustments to the orientation of the camera 22 result in relatively large movements between the head bowl surface 24 and the contact points at the upper ends of the poles 12A-12C. As a consequence, the camera stand 10 readily accommodates very fine adjustments to the camera position.

Thus, the radius of curvature 26 also represents the "radius of support" provided by the head bowl 20. In the illustrated embodiment, the radius of curvature or support 26 is approximately 8 inches. However, it is recognized that a range of radii of support of 5 to 20 inches or more is satisfactory, depending upon the size and weight of the camera to be mounted. In contrast, the radius of support of many prior art head mechanisms is quite small, on the order of a couple inches or less, often making fine adjustments to the camera position very difficult.

The center of curvature 28 also defines the center of support and rotation of the head bowl 20. In another feature of the present invention, the center of support and rotation 28 coincides substantially with the center of gravity of the camera 22 when mounted on the head bowl 20. Such an arrangement adds significantly to the stability of the stand mounted camera. For example, as the camera 22 is tilted and panned on the stand 10, any movement of the center of gravity of the camera 22 is substantially reduced. As a consequence, the ability to make fine adjustments to the vertical orientation (tilt) of the camera is enhanced. Furthermore, jarring of the camera caused by inadvertent bumping of the stand by the camera operation is reduced.

In contrast, in many prior art tripod heads, the center of gravity of the camera is significantly above the horizontal axis of rotation of the head tilt adjustment mechanism. As a consequence, fine adjustments to the vertical orientation of the camera are made more difficult. In addition, the displaced center of gravity often causes the vertical position of the camera to tilt further as the mechanism is "locked" in position.

As previously mentioned, the tripod 15 is formed from three poles 12A-12C which are pivotally coupled at a pivot point 14. In the deployed position illustrated in FIGS. 1, 2 and 7-9, the poles cross each other (FIG. 8) to form a tripod base 16 and an inverted tripod 18 to cradle the head bowl 20. In the illustrated embodiment, the poles 12A-12C each comprise a tubular upper member 36 and a telescoping lower tubular member 38 to provide desired height adjustment of the stand 10. The telescoping members 36 and 38 may be locked in position at the desired height by any of a number of well known locking mechanisms including detents, pins, lock nuts, etc. Alternatively, the poles 12A-12C may each be formed from a single integral tubular member. Whether or not the poles 12A-12C are provided with a telescoping capability, it should be appreciated that the head and legs of the stand 10 have been combined using the poles 12A-12C for increased strength and stability. In contrast, many prior art tripod stands attach the legs of the tripod to a separate head by means of small fittings which can weaken the overall strength of the stand. In addition, because of the long length of the legs, the legs can exert substantial leverage on the small fittings, resulting in undesired loosening and play in the attachment.

Figure 4:
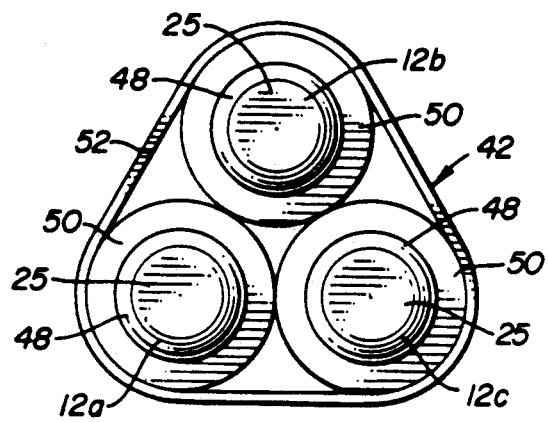
FIG. 4 is a cross-sectional view of the tripod of FIG. 3 viewed along the lines 4—4.
Figure 5:
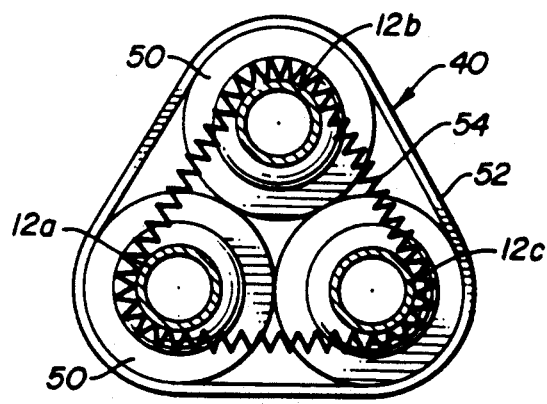
FIG. 5 is a cross-sectional view of the tripod of FIG. 3, viewed along the lines 5—5.
Figure 6:
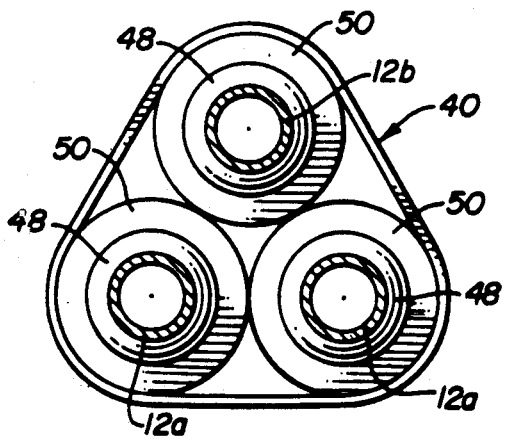
FIG. 6 is a cross-sectional view of the tripod of FIG. 3, viewed along the lines 6—6.

In another feature of the present invention, the poles 12A-12C of the tripod may be easily pivoted to a collapsed position for storage or transport, as illustrated in FIGS. 3-6. In the collapsed position illustrated therein, the poles 12A-12C are parallel to each other to provide a very compact structure.

To facilitate the pivoting of the poles 12A-12C between the deployed and collapsed positions, the tripod 15 of the illustrated embodiment has two sets of spaced pivot point bearings 40 and 42. Each of the pivot point bearings comprises a ball and socket joint made of metal, plastic or other material, for each of the poles of the tripod. Thus, each pole carries a spherical ball-shaped bearing 48 journaled within a socket type bearing 50. The sockets 50 of each ball and socket joint are coupled together by a band 52 encircling the ball and socket joints. To simplify manufacture, it is anticipated that the socket type bearings or races 50 can be fabricated of a single piece of metal, plastic or other material.

The poles 12A-12C are spring loaded by means of an elastic band or spring 54 which encircles the center pivot point 14 between the bearings 40 and 42. Such an arrangement has been found to minimize any "play" in the tripod 15 yet allow the poles of the tripod to be quickly and easily pivoted back and forth between the deployed and collapsed positions as desired. Other pivoting mechanisms such as those described in U.S. Pat. Nos. 1,371,263; 1,561,371; 2,172,123; 2,710,733; and 3,309,055 and 4,027,988 may also be used.

It is seen from the above that the present invention provides a unique camera stand which is simple and inexpensive yet is highly stable and easy to use. The stand may be quickly deployed and the camera mounted on the stand almost instantaneously without requiring the adjustment and locking of various mechanisms. Also, because the center of gravity of the camera is placed close to the center of rotation of the camera head, fine adjustments to the camera position are readily made. Also, the stability of the stand is enhanced.

It will, of course, be understood that modifications of the present invention, in its various aspects will be apparent to those skilled in the art, some being apparent only after study and others being matters of routine mechanical design. For example, the head bowl 22 may be provided with other than a spherical surface. In addition, the stand may have other than three legs. Other embodiments are also possible, with their specific designs depending upon the particular application. As such, the scope of the invention should not be limited by the particular embodiment herein described but should be defined only by the appended claims and equivalents thereof.

I claim:

1. A camera stand, comprising:
a bowl-shaped camera mount having a generally spherical-shaped bottom surface and a top surface having means for securely attaching a camera; and
a tripod having three elongated elements and coupling means for coupling the three elements together so as to space the upper ends of the elements sufficiently to receive and support the bowl-shaped mount to define a deployed position and so as to allow the upper ends of the elements to close together to define a collapsed position, wherein said spherical-shaped bottom surface has a radius of curvature sufficiently large to be retained in a plurality of positions by frictional engagement with the upper ends of the elements in the deployed position under the influence of gravity.

2. The stand of claim 1 wherein the radius of curvature is 5 to 20 inches.

3. The stand of claim 2 wherein the radius of curvature is approximately 8 inches.

4. A camera stand, comprising:
a mount having a generally spherical-shaped bottom surface and a top surface having means for securely attaching a camera; and a tripod comprising three poles and coupling means for coupling said poles together so as to form a lower tripod base and an inverted upper tripod having ends spaced to receive and cradle the camera mount bottom surface to define a deployed position and so as to allow the upper tripod to close to define a collapsed position, wherein said spherical-shaped bottom surface has a radius of curvature sufficiently large to be retained in various positions by frictional engagement with the ends of the inverted upper tripod under the influence of gravity.

5. The stand of claim 4 wherein the coupling means comprises an elastic band or spring encircling the three poles and a set of pivot bearings comprising three socket bearings coupled together and three ball-shaped bearings journaled in the socket bearings, each pole being attached to an associated ball-shaped bearing.

6. The stand of claim 5 further comprising a second set of pivot bearings substantially similar to the first set of bearings and spaced from the first set of bearings with the elastic band or spring placed between them.

7. The stand of claim 4 wherein the radius of curvature is 5 to 20 inches.

8. The stand of claim 4 wherein the radius of curvature is approximately 8 inches.

9. A camera stand, comprising:
a mount having a generally spherical-shaped bottom surface and a top surface having means for securely attaching a camera; and a plurality of poles which are coupled together so as to form a lower base and an upper cradle having ends spaced to receive the camera mount bottom surface to define a deployed position and so as to close the upper ends together to define a collapsed position, wherein said spherical-shaped bottom surface has a radius of curvature sufficiently large to be retained in various positions by frictional engagement with the ends of the upper cradle under the influence of gravity.

10. The stand of claim 9 wherein the radius of curvature is 5 to 20 inches.

11. The stand of claim 9 wherein the radius of curvature is approximately 8 inches.

12. A camera stand, comprising:
a mount having a generally spherical-shaped bottom surface and a top surface having means for securely attaching a camera, said bottom surface having a radius of curvature of approximately 8 inches; and
a tripod comprising three poles, and means for coupling the poles together so as to form a lower tripod base and an inverted upper tripod having ends spaced sufficiently to receive and cradle the mount bottom surface to thereby retain the mount in a plurality of positions by frictional engagement with the ends of the inverted upper tripod under the influence of gravity alone;
wherein said coupling means comprises first and second sets of pivot bearings, each set comprising three socket bearings coupled together and three ball-shaped bearings, each ball-shaped bearing being journaled in an associated socket bearing, and an elastic band encircling the three poles and placed between the first and the second sets of pivot bearings, each pole being attached to an associated ball-shaped bearing of each set of pivot bearings.

13. The stand of claim 12 wherein said tripod further comprises a cap placed over each of the upper ends of said upper tripod for enhancing the frictional engagement between said upper tripod and said mount.

* * * * *